United States Patent

Kimura

[11] 4,229,087
[45] Oct. 21, 1980

[54] FOCUSING OPTICAL SYSTEM FOR SINGLE-LENS REFLEX

[75] Inventor: Tadashi Kimura, Tokyo, Japan

[73] Assignee: Olympus Optical Co., Ltd., Tokyo, Japan

[21] Appl. No.: 7,591

[22] Filed: Jan. 29, 1979

[30] Foreign Application Priority Data

Feb. 10, 1978 [JP] Japan .................................. 53-13606

[51] Int. Cl.³ .............................................. G03B 13/16
[52] U.S. Cl. .................................. 354/23 R; 354/25; 354/155; 354/200; 354/219
[58] Field of Search ................... 354/22, 23 R, 25, 56, 354/59, 155, 166, 219, 195, 199, 200, 201

[56] References Cited

U.S. PATENT DOCUMENTS

3,529,527  9/1970  Leitz ................................. 354/201 X

FOREIGN PATENT DOCUMENTS

50-85233  7/1975  Japan .
52-99820  8/1977  Japan .
52-138924  11/1977  Japan .
1002033  8/1965  United Kingdom ..................... 354/200

*Primary Examiner*—L. T. Hix
*Assistant Examiner*—William B. Perkey
*Attorney, Agent, or Firm*—Cushman, Darby & Cushman

[57] ABSTRACT

A focusing optical system for single-lens reflex cameras comprising an auxiliary lens arranged in the vicinity of the focusing surface of a focusing glass and a detector element arranged in the vicinity of a penta-prism, and so adapted as to detect the focusing point by transferring a portion of the light from an object to said detector element.

7 Claims, 8 Drawing Figures

FOCUSING OPTICAL SYSTEM FOR SINGLE-LENS REFLEX

BACKGROUND OF THE INVENTION

1. Field of the Invention

The present invention relates to a focusing optical system and, more specifically, to a focusing optical system for single-lens reflex cameras.

2. Description of the Prior Art

Illustrated in FIG. 1 is an example of the conventional focusing optical systems in which a detector element 2 is arranged on a focusing glass 1 so that a photographing lens of a single-lens reflex camera can be focused on the basis of the light intensity detected with the detector element 2. In another example of the conventional focusing optical systems, a semitransparent mirror is arranged in the focusing glass 1 and the light split by the semitransparent mirror is re-focused with a lens onto a detector element arranged, for example, beside the focusing lens for focusing the photographing lens of a single-lens reflex camera in the similar manner. In these conventional focusing optical systems, the central portion of the visual field in the view-finder is darkened or, in the worse cases, the image at such a portion is made quite invisible by the detector element on the focusing glass or the semitransparent mirror in the focusing glass, thereby resulting in adverse effect on observation through the view-finder.

SUMMARY OF THE INVENTION

A general object of the present invention is to provide a focusing optical system for single-lens reflex cameras comprising a detector element which is arranged in the vicinity of the surface of incidence of a penta-prism and an auxiliary lens which is arranged in the vicinity of a focusing glass and functions to focus a portion of the light to be focused by the photographic lens of said camera. The focusing optical system according to the present invention comprises, as shown in FIG. 2, a detector element 12 at or near the center of the surface of incidence 11a of the penta-prism, and is adapted in such a way that the light A focused or to be focused by the photographic lens onto the focusing glass 13 is focused on the detector element arranged in the vicinity of the surface of incidence of the penta-prism with an auxiliary focusing means which is arranged at or near the center of said focusing glass.

DESCRIPTION OF THE PREFERRED EMBODIMENTS

Now, the present invention will be described in more detail with reference to the embodiments illustrated in the accompanying drawings.

Figure 1:
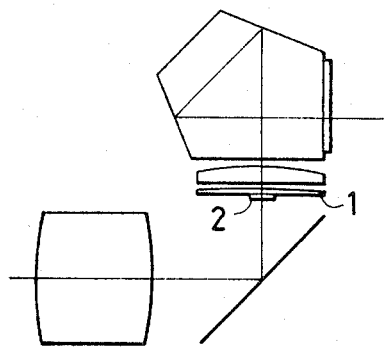
FIG. 1 shows a sectional view illustrating the composition of the conventional focusing optical system for single-lens reflex cameras.
Figure 2:
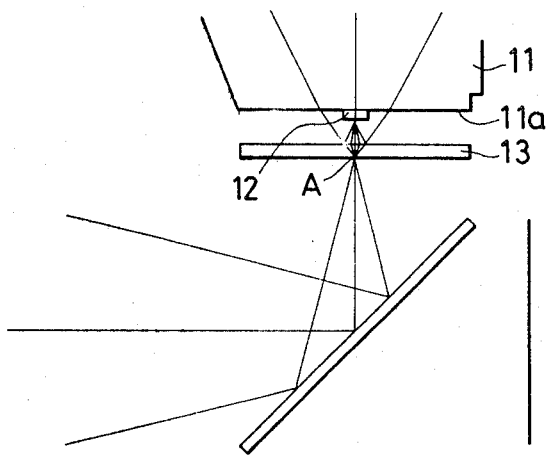
FIG. 2 shows a sectional view illustrating the principle of the focusing optical system for single-lens reflex cameras according to the present invention.
Figure 3:
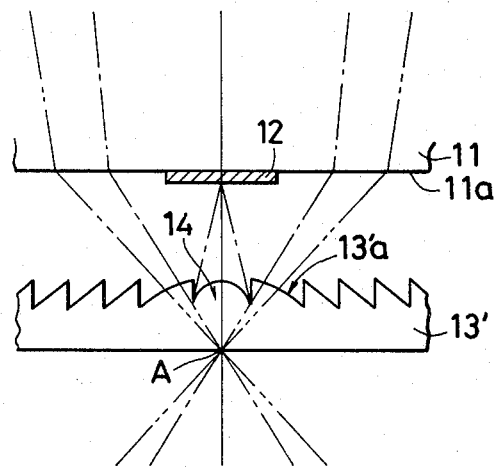
FIG. 3 through FIG. 6 illustrate sectional views showing the compositions of some preferred embodiments of the present invention.

Shown in FIG. 3 is a first embodiment of the present invention, wherein a detector element 12 for detecting the focal point is arranged on the surface of incidence 11a of the penta-prism 11. The reference numeral 13' represents a focusing glass consisting of a Fresnel lens. This Fresnel lens has an auxiliary lens 14 formed on the central spherical surface 13'a and is constructed in such a way that the light focused on the focusing surface A is refocused on the detector element 12 with said auxiliary lens 14. That is to say, the curvature at the center of the Fresnel lens having said auxiliary lens 14 is different from that at other surfaces. Such a construction makes it possible to locate the detector element apart from the focusing surface and focus a photographic lens of a single-lens reflex camera by re-focusing with the auxiliary lens which transfers the image on the focusing surface of the focusing glass.

Figure 4:
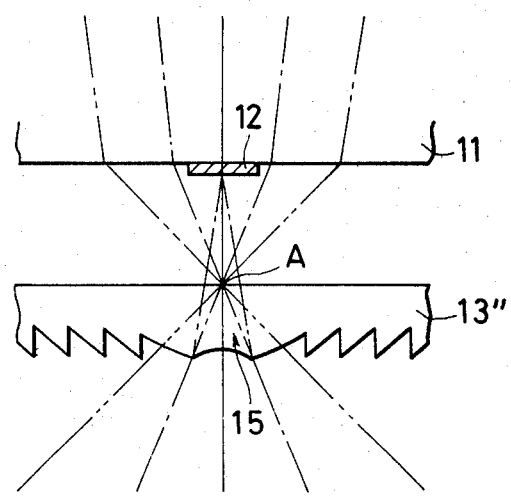

FIG. 4 illustrates a second embodiment of the present invention, in which a Fresnel lens 13'' is arranged with its Fresnel surface facing downward and a concave lens 15 is formed as an auxiliary lens at the central spherical surface of said Fresnel lens, whereby the portion of the light to be focused on the focusing surface is focused on the detector element.

Figure 5:
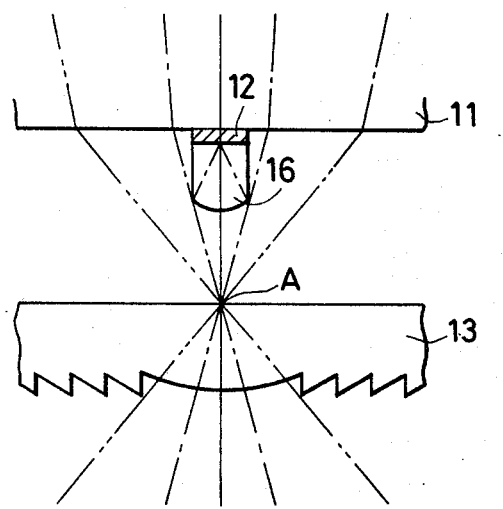

Illustrated in FIG. 5 is a third embodiment of the present invention, in which a convex lens 16 is arranged in front of the surface of incidence of the penta-prism as the auxiliary lens functioning in place of that formed at the central spherical surface of the Fresnel surface of the Fresnel lens in the Embodiment 1 shown in FIG. 3. In the Embodiment 3, the auxiliary lens may be arranged apart from the detector element. For facilitating to fix the auxiliary lens, however, it is preferable to design the auxiliary lens as a thick lens having a convex surface on one side and a flat surface on the other side and arrange said lens so as to be in contact with the detector element 12 on its flat surface, since said convex lens 16 can easily be bonded to the detector element 12. Further, it is possible to arrange, as said auxiliary lens, an optical element consisting of nonuniform media instead of an ordinary optical lens. The embodiment shown in FIG. 6 in which the Fresnel lens 13 is arranged with its Fresnel surface facing upward has a construction substantially the same as that of the Embodiment 3 shown in FIG. 5. Furthermore, it is not always necessary to arrange the detector element on the surface of incidence of the penta-prism, but said detector element may be embedded into the penta-prism as illustrated in FIG. 7. In such a case, it will be possible to design the penta-prism as two parts $B_1$ and $B_2$, for example, divided along the chain line B shown in the figure and embed the detector element into the penta-prism by bonding the two parts to each other. It will be needless to say that such an arrangement of the detector is made applicable to all the above-described embodiments by selecting appropriate an focal length for the auxiliary lens. When such an arrangement of the detector is adopted in the focusing optical system, it is possible to reserve a long distance from the focusing position A to the detecting surface 12, thereby enabling a long focal length to be selected for the auxiliary lens and afford depth of focus to improve measuring accuracy.

Figure 8:
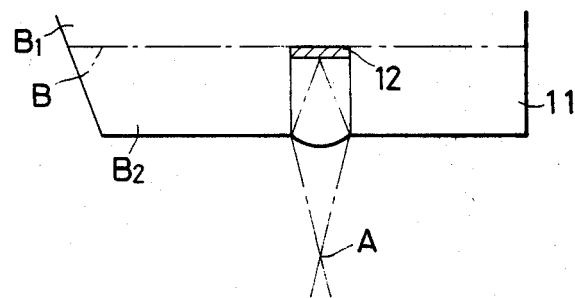

When the detector element is embedded into the penta-prism, it is further possible to arrange the auxiliary lens as a convex surface formed on a portion of the surface of incidence of the penta-prism as shown in FIG. 8. Moreover, it is possible to utilize ring-shaped light for focusing a photographic lens of a single-lens reflex camera by designing a ring-shaped detector element and auxiliary lens, though the detector element and auxiliary lens are arranged along the optical axis in the above-described embodiments.

Figure 6:
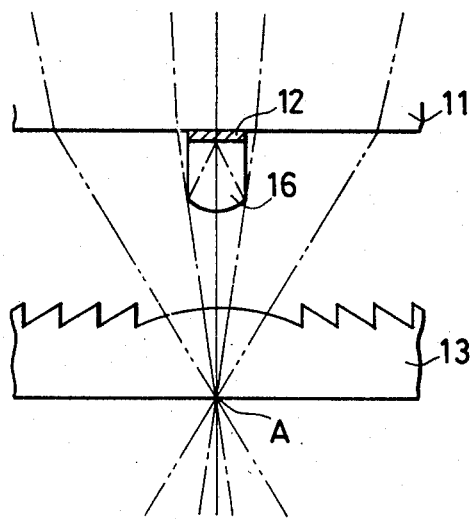
Figure 7:
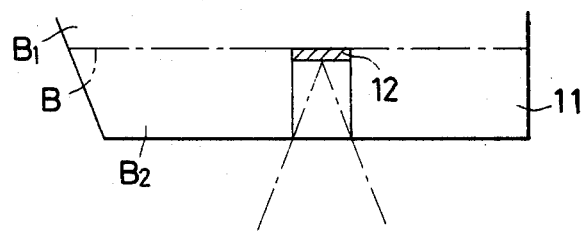
FIG. 7 and FIG. 8 illustrate sectional view exemplifying arrangements of the detector element used in the focusing optical system according to the present invention.

Furthermore, it is possible to arrange an additional auxiliary lens between the focusing glass and the detector element by applying the conception illustrated in FIG. 5 and FIG. 6 to the construction shown in FIG. 3 and FIG. 4 in which an auxiliary lens such as a Fresnel lens is formed on the focusing glass.

As is clear from the foregoing descriptions, the focusing optical system according to the present invention is adapted in such a way that the central portion in the view-finder is not darkened since the detector element is arranged apart from the focusing surface of the photographic lens and most of the light at the central portion of the view-finder can reach photographer's eye, and that the image of the view-finder is blurred and not observable together with the visual field of the view-finder, thereby causing no hindrance to the function of the view-finder since the image of the detector element itself is formed apart from that of the visual field of the view-finder. Further, the focusing optical system according to the present invention permits effective detection with little loss in light intensity since it can directly measure a portion of the light incident on the view-finder. Furthermore, the focusing optical system according to the present invention can be easily assembled in an existing single-lens reflex camera with slight modifications such as modification of the focusing glass and addition of a few optical elements, and is almost free from influence due to manufacturing errors since it requires small number of parts to be added. The focusing glass and penta-prism can easily be manufactured by molding a plastic material and cutting a prism.

I claim:

1. A focusing optical system for single-lens reflex which includes a viewfinder having an optical axis, said optical system comprising a photographing lens, a focusing glass arranged at the position at which an object image is formed by said photographing lens, a penta-prism arranged at the back of said focusing glass, image detecting means, arranged on said optical axis in contact with said penta-prism, for detecting light intensity of paraxial rays for enabling automatic focusing of said photographing lens and an auxiliary optical means for transferring a portion of the image of the object image formed on said focusing glass to said image detecting means.

2. A focusing optical system for single-lens reflex cameras according to claim 1 wherein said auxiliary optical means is a convex lens formed at the central portion of said focusing glass.

3. A focusing optical system for single-lens reflex cameras according to claim 1 wherein said auxiliary optical means is a concave lens formed at the central portion of said focusing glass.

4. A focusing optical system for single-lens reflex cameras according to claim 1 wherein said auxiliary optical means is a convex lens arranged between said focusing glass and said detector element.

5. A focusing optical system for single-lens reflex cameras according to claim 1 wherein said auxiliary optical means is a plano-convex lens bonded to said detector element on its flat surface.

6. A focusing optical system for single-lens reflex cameras according to claim 1 wherein said detector element is arranged in said penta-prism.

7. A focusing optical system for single-lens reflex cameras according to claim 6 wherein said auxiliary optical means is a plano-convex lens bonded to said detector means on its flat surface.

* * * * *